United States Patent
Watanuki et al.

(10) Patent No.: US 10,125,703 B2
(45) Date of Patent: Nov. 13, 2018

(54) INTERNAL COMBUSTION ENGINE EGR FLOW RATE ESTIMATION APPARATUS AND INTERNAL COMBUSTION ENGINE CONTROL APPARATUS

(71) Applicant: Mitsubishi Electric Corporation, Tokyo (JP)

(72) Inventors: Takuo Watanuki, Tokyo (JP); Hideki Hagari, Tokyo (JP); Tomokazu Makino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 316 days.

(21) Appl. No.: 14/565,465

(22) Filed: Dec. 10, 2014

(65) Prior Publication Data
US 2016/0069285 A1    Mar. 10, 2016

(30) Foreign Application Priority Data
Sep. 10, 2014    (JP) ................................ 2014-183822

(51) Int. Cl.
    *F01L 1/34*      (2006.01)
    *F02D 41/00*      (2006.01)
    (Continued)

(52) U.S. Cl.
CPC ....... *F02D 41/0072* (2013.01); *F02D 41/006* (2013.01); *F02D 41/0077* (2013.01);
(Continued)

(58) Field of Classification Search
CPC ............... Y02T 10/47; F02D 2041/001; F02D 2200/0406; F02D 41/005; F02D 41/0065;
(Continued)

(56) References Cited

U.S. PATENT DOCUMENTS 5,505,174 A    4/1996   Komoriya et al.
5,619,974 A    4/1997   Rodefeld et al.
(Continued)

FOREIGN PATENT DOCUMENTS

JP      07-279774 A    10/1995

OTHER PUBLICATIONS

Communication dated Sep. 28, 2015, issued by the German Patent Office in counterpart German Application No. 102015200432.5.

*Primary Examiner* — Hai Huynh
*Assistant Examiner* — Gonzalo Laguarda
(74) *Attorney, Agent, or Firm* — Sughrue Mion, PLLC; Richard C. Turner

(57) ABSTRACT

Based on an internal EGR ratio and desired external and internal EGR ratios, an EGR valve opening degree is feedback-controlled based on a desired EGR ratio, calculated in such a way as to perform correction so that a total EGR ratio becomes constant, and an EGR effective opening area obtained through learning of the relationship between an EGR valve opening degree and an effective opening area; thus, a correct characteristic of EGR valve opening degree vs. effective opening area can be maintained and hence it is made possible to absorb variations, changes with time, and even environmental conditions, while making an EGR valve and an intake/exhaust VVT collaborate with each other; therefore, an EGR flow rate can accurately be estimated.

7 Claims, 8 Drawing Sheets

(51) Int. Cl.
*F02D 41/14* (2006.01)
*F02D 41/24* (2006.01)
*F02M 26/47* (2016.01)
*F02M 26/48* (2016.01)
*F02M 26/53* (2016.01)
*F02D 41/18* (2006.01)

(52) U.S. Cl.
CPC ....... *F02D 41/145* (2013.01); *F02D 41/2451* (2013.01); *F02M 26/47* (2016.02); *F02M 26/48* (2016.02); *F02M 26/53* (2016.02); *F02D 41/0062* (2013.01); *F02D 41/1401* (2013.01); *F02D 41/18* (2013.01); *F02D 2200/0404* (2013.01); *F02D 2200/0406* (2013.01); *F02D 2200/0414* (2013.01); *F02D 2200/703* (2013.01); *Y02T 10/47* (2013.01)

(58) Field of Classification Search
CPC ............... F02D 41/0072; F02D 41/006; F02D 41/0077; F02D 41/145; F02D 41/2451; F02M 26/01; F02M 25/0756; F02M 25/0754; F02M 25/0772
USPC ........................................................ 701/108
See application file for complete search history.

(56) References Cited

U.S. PATENT DOCUMENTS

| | | | | |
|---|---|---|---|---|
| 6,012,431 | A * | 1/2000 | Itoyama | ................ F02D 41/005 123/480 |
| 2007/0074707 | A1* | 4/2007 | Ogawa | .................. F02M 26/01 123/568.14 |
| 2013/0245967 | A1* | 9/2013 | Hagari | .................... F02D 41/18 702/45 |
| 2014/0360179 | A1* | 12/2014 | Doering | ................ F02B 37/183 60/602 |

* cited by examiner

|  | Ne | | |
|---|---|---|---|
|  | 1500 | 3000 | 4500 |
| Pb/Pa 0.1 | 0.5 | 0.5 | 0.5 |
| 0.2 | 0.6 | 0.6 | 0.55 |
| 0.3 | 0.7 | 0.7 | 0.65 |
| 0.4 | 0.8 | 0.8 | 0.75 |
| 0.6 | 0.9 | 0.9 | 0.85 |
| 0.8 | 0.95 | 0.92 | 0.9 |
| 1 | 0.95 | 0.95 | 0.95 |

FIG. 10

|  |  | Segr |
|---|---|---|
|  | 10% | 5 |
|  | 20% | 10 |
| Est | 30% | 15 |
|  | 40% | 20 |
|  | 60% | 25 |
|  | 80% | 40 |
|  | 100% | 50 |

FIG. 11

|  |  | LEARNING VALUE |
|---|---|---|
|  | 10% | 0.5 |
|  | 20% | 1 |
| Est | 30% | 1.5 |
|  | 40% | −1 |
|  | 60% | −2 |
|  | 80% | −1 |
|  | 100% | −3 |

INTERNAL COMBUSTION ENGINE EGR FLOW RATE ESTIMATION APPARATUS AND INTERNAL COMBUSTION ENGINE CONTROL APPARATUS

BACKGROUND OF THE INVENTION

Field of the Invention

The present invention relates to an internal combustion engine EGR flow rate estimation apparatus and an internal combustion engine control apparatus provided with the EGR flow rate estimation apparatus.

Description of the Related Art

In order to appropriately control an internal combustion engine, it is important to accurately calculate the amount of air taken into a cylinder and to perform fuel control and ignition timing control in accordance with the amount of air taken into the cylinder flow. In general, as the methods of measuring the amount of air taken into a cylinder of an internal combustion engine, there exist two kinds of methods, i.e., a method (hereinafter, referred to as an AFS method) in which an air flow rate is measured by an air flow sensor (hereinafter, referred to as an AFS (Air Flow Sensor)) provided at the upstream side of the throttle valve in an intake pipe of an internal combustion engine and a method (referred to as an S/D (Speed Density) method) in which there is provided an intake manifold pressure sensor for measuring the inner pressure of an intake manifold as the generic name of an intake pipe including a surge tank, situated at the downstream side of the throttle valve in an intake pipe, and the flow rate of air taken into a cylinder is estimated based on the intake manifold pressure measured by the intake manifold pressure sensor and the rotation speed of the internal combustion engine. In addition, there exist also a method in which these sensors are concurrently provided and the foregoing methods are switched in accordance with the driving state of the internal combustion engine and a method which is an AFS method but utilizes a measured intake manifold pressure.

With regard to fuel control in an internal combustion engine, when feedback control can be performed in such a way that, primarily, a fuel, the amount of which causes a desired air-fuel ratio for a cylinder intake air flow rate, is injected, almost excellent controllability can be obtained; however, ignition timing control needs to be performed at an ignition advance angle which causes a maximum output (referred to as an MBT (Minimum Spark Advance for Best Torque), hereinafter) in accordance with not only the rotation speed of the internal combustion engine and the cylinder intake air flow rate but also other factors such as the temperature of the internal combustion engine, whether or not a knock has occurred, the fuel property, and the EGR (Exhaust Gas Recirculation) rate (the ratio of the EGR flow rate to the intake air flow rate). Among the foregoing factors that provide effects to the MBT, for example, the temperature of an internal combustion engine and whether or not a knock has occurred can be detected by an engine coolant temperature sensor and a knock sensor, respectively; with regard to the fuel property, it can be determined whether the fuel is regular gasoline or high-octane gasoline, based on whether or not a knock has occurred.

Meanwhile, with regard to the EGR ratio, there are two methods, i.e., a method (referred to as an external EGR, hereinafter) in which an EGR valve is provided in an EGR path that connects the exhaust pipe with the intake pipe of the internal combustion engine and the EGR amount is controlled based on the opening degree of the EGR valve and a method (referred to as an internal EGR) in which a variable valve timing mechanism (referred to as a VVT (Variable Valve Timing), hereinafter), which makes the opening/closing timings of an intake valve and an exhaust valve variable, is provided and depending on the opening/closing timing of the VVT, an overlap period, during which the intake valve and the exhaust valve are concurrently opened, is changed so that the amount of EGR, which is caused by remaining exhaust gas in the cylinder, is controlled; in some cases, both the methods are concurrently utilized. In the external EGR control method, the EGR ratio can approximately be calculated from the opening degree of the EGR valve, the exhaust pressure, and the inner-intake-pipe pressure.

In the following explanation, an EGR and an EGR ratio, when simply expressed in this manner, denote an external EGR and an external EGR ratio, respectively. The external EGR ratio denotes the ratio of the external EGR flow rate to the intake air flow rate, and the internal EGR ratio denotes the ratio of the internal EGR flow rate to the intake air flow rate.

Because in recent years, in order to further reduce the fuel cost and further raise the output, there is commonly utilized an external-EGR-method internal combustion engine or an internal combustion engine having a VVT for an intake valve and an exhaust valve (hereinafter, referred to as an intake/exhaust VVT), the amount of air taken into the cylinder through the intake manifold largely changes depending on the opening degree or the valve timing of the EGR valve; therefore, unless the effect of the EGR valve opening degree or the effect of the valve timing, of the EGR valve, determined by the intake/exhaust VVT is considered, the accuracy of calculating the amount of air taken into the cylinder in the whole driving region including the steady and the transient mode is largely deteriorated, especially, in a S/D method. Because when the opening degree or the valve timing of the EGR valve is changed, the response is delayed, the fact that during transient driving, the changed opening degree or the valve timing of the EGR valve does not coincide with the opening degree or the valve timing of the EGR valve, which has been set during steady driving, causes the accuracy of calculating the air flow rate to largely deteriorate.

In recent years, it has become common that an internal combustion engine is controlled by utilizing, as an index, the output torque of the internal combustion engine; even when the output torque is estimated, the thermal efficiency changes in accordance with the cylinder intake air flow rate and the EGR ratio. Accordingly, in order to calculate the foregoing MBT and furthermore in order to estimate the torque and the thermal efficiency, it is required to accurately calculate the cylinder intake air flow rate and the EGR ratio. In order to obtain the EGR ratio, it is required to accurately calculate the EGR flow rate.

Therefore, to date, as a method of calculating an EGR flow rate and an EGR ratio, the method disclosed in Patent Document 1 has been proposed. Patent Document 1 discloses a method in which the EGR flow rate is calculated based on an exhaust gas amount obtained from the opening area of an EGR valve and an exhaust gas amount obtained from an opening area command value for the EGR valve, and then the EGR ratio is estimated. The method disclosed in Patent Document 1 makes it possible that with a simple configuration, an EGR flow rate is calculated by utilizing a preliminarily provided "EGR valve opening degree vs. flow rate characteristic" and the opening area of an EGR valve.

PRIOR ART REFERENCE

Patent Document

[Patent Document 1] Japanese Patent Application Laid-Open No. H7-279774

An apparatus utilizing the conventional method disclosed in Patent Document 1 has a problem that when due to a change over time, the opening degree characteristic of the EGR valve changes, the preliminarily prepared flow rate characteristic and the actual flow rate characteristic differ from each other and hence the estimation accuracy is deteriorated. The opening degree vs. flow rate characteristic of an EGR valve may change depending on not only differences among products but also the condition of an internal combustion engine in which the EGR valve is mounted. Accordingly, it is conceivable that the relationship between the EGR valve opening degree and the effective opening area or the flow rate is preliminarily studied so as to accurately estimate the external EGR flow rate; however, when the EGR and the intake/exhaust VVT are concurrently controlled, exhaust air remains inside the cylinder, in addition to the external EGR flow rate, and hence an internal EGR flow rate occurs; thus, there has been a problem that the study of only the relationship between the EGR valve opening degree and the effective opening area or the flow rate cannot secure the accuracy. Moreover, there has been a problem that when there exists a change over time or individual unevenness in not only the EGR but also the intake/exhaust VVT, unevenness is caused in the calculated EGR flow rate, regardless of whether the internal combustion engine is in the steady-operation mode or in the transient operation mode.

SUMMARY OF THE INVENTION

The present invention has been implemented in order to solve the foregoing problems in the conventional apparatuses; the objective thereof is to provide an internal combustion engine control apparatus that makes it possible that an EGR valve and an intake/exhaust VVT collaborate with each other and an EGR flow rate can more accurately be estimated.

An internal combustion engine EGR flow rate estimation apparatus according to the present invention estimates an EGR flow rate in an EGR flow path connecting an air-intake path at the downstream side of a throttle valve of an internal combustion engine and an exhaust path of the internal combustion engine; the internal combustion engine EGR flow rate estimation apparatus is characterized by including an intake air flow rate calculation unit that calculates a flow rate of air taken into a cylinder of the internal combustion engine through the throttle valve of the internal combustion engine; an EGR valve that opens or closes the EGR path so as to control an external EGR flow rate as an EGR flow rate in the EGR path; a volume efficiency correction coefficient calculation unit that calculates a volume efficiency correction coefficient, as a volume efficiency corresponding value which is an index for indicating an amount of air that flows into a cylinder of the internal combustion engine, based on valve timing control of at least one of an intake valve and an exhaust valve of the internal combustion engine; a cylinder flow rate calculation unit that calculates a cylinder flow rate of air that flows from the air-intake path at the downstream side of the throttle valve into the cylinder, based on a pressure in the air-intake path and the calculated volume efficiency correction coefficient; an internal EGR ratio estimation unit that estimates, based on the valve timing control, an internal EGR ratio which is the ratio of an internal EGR flow rate, as a flow rate of exhaust gas, of the internal combustion engine, that remains in the cylinder, to the intake air flow rate calculated by the intake air flow rate calculation unit; a desired intake air flow rate calculation unit that calculates a desired intake air flow rate of the internal combustion engine, based on desired torque of the internal combustion engine; a desired external/internal EGR ratio estimation unit that estimates a desired external EGR ratio and a desired internal EGR ratio, based on the desired intake air flow rate calculated by the desired intake air flow rate calculation unit and a rotation speed of the internal combustion engine; a desired EGR ratio estimation unit that calculates a desired EGR ratio, based on the desired external EGR ratio and the desired internal EGR ratio estimated by the desired external/internal EGR ratio estimation unit and the internal EGR ratio estimated by the internal EGR ratio estimation unit; an EGR flow rate calculation unit that calculates an EGR flow rate, based on the cylinder flow rate calculated by the cylinder flow rate calculation unit and the intake air flow rate calculated by the intake air flow rate calculation unit; an EGR effective opening area calculation unit that calculates an effective opening area of the EGR valve corresponding to an opening degree of the EGR valve, based on the EGR flow rate calculated by the EGR flow rate calculation unit; an EGR effective opening area learning unit that learns a relationship between an EGR valve opening degree based on an output of an EGR valve opening degree sensor that detects an opening degree of the EGR valve and the EGR effective opening area calculated by the EGR effective opening area calculation unit; and an EGR valve opening degree calculation unit that calculates an opening degree of the EGR valve. The internal combustion engine EGR flow rate estimation apparatus is further characterized in that the EGR valve opening degree calculation unit calculates an EGR valve opening degree utilized in control of the internal combustion engine, based on the desired EGR ratio estimated by the desired EGR ratio estimation unit, the EGR effective opening area calculated by the EGR effective opening area calculation unit, and a learning value learned by the EGR effective opening area learning unit.

Moreover, an internal combustion engine control apparatus according to the present invention is characterized by including the internal combustion engine EGR flow rate estimation apparatus configured in such a manner as described above.

An internal combustion engine EGR flow rate estimation apparatus according to present invention makes it possible to absorb variations, changes with time, and even environmental conditions, while making the EGR valve and the intake/exhaust VVT collaborate with each other; therefore, the EGR flow rate can accurately be estimated. In particular, based on an internal EGR ratio and desired external and internal EGR ratios, a desired EGR ratio is calculated in such a way as to perform correction so that a total EGR ratio becomes constant, and then, an EGR valve opening degree is feedback-controlled based on the desired EGR ratio and an EGR effective opening area obtained through learning of the relationship between an EGR valve opening degree and an effective opening area; thus, a correct characteristic of EGR valve opening degree vs. effective opening area can be maintained and hence it is made possible to absorb variations, changes with time, and even environmental conditions, while making an EGR valve and an intake/exhaust VVT collaborate with each other; therefore, the EGR flow rate can extremely accurately be estimated.

Because an internal combustion engine control apparatus according to the present invention is provided with the internal combustion engine EGR flow rate estimation apparatus configured in such a manner as described above, it is made possible to absorb variations, changes with time, and even environmental conditions, while making an EGR valve and an intake/exhaust VVT collaborate with each other; therefore, the internal combustion engine can accurately be controlled.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 10 is a table representing the map for the relationship between the EGR valve opening degree and the effective opening area in the internal combustion engine EGR flow rate estimation apparatus according to Embodiment 1 of the present invention;

FIG. 11 is a table representing the map for the relationship between the EGR valve opening degree and the learning value in the internal combustion engine EGR flow rate estimation apparatus according to Embodiment 1 of the present invention.

DETAILED DESCRIPTION OF THE PREFERRED EMBODIMENTS

Embodiment 1

Figure 1:
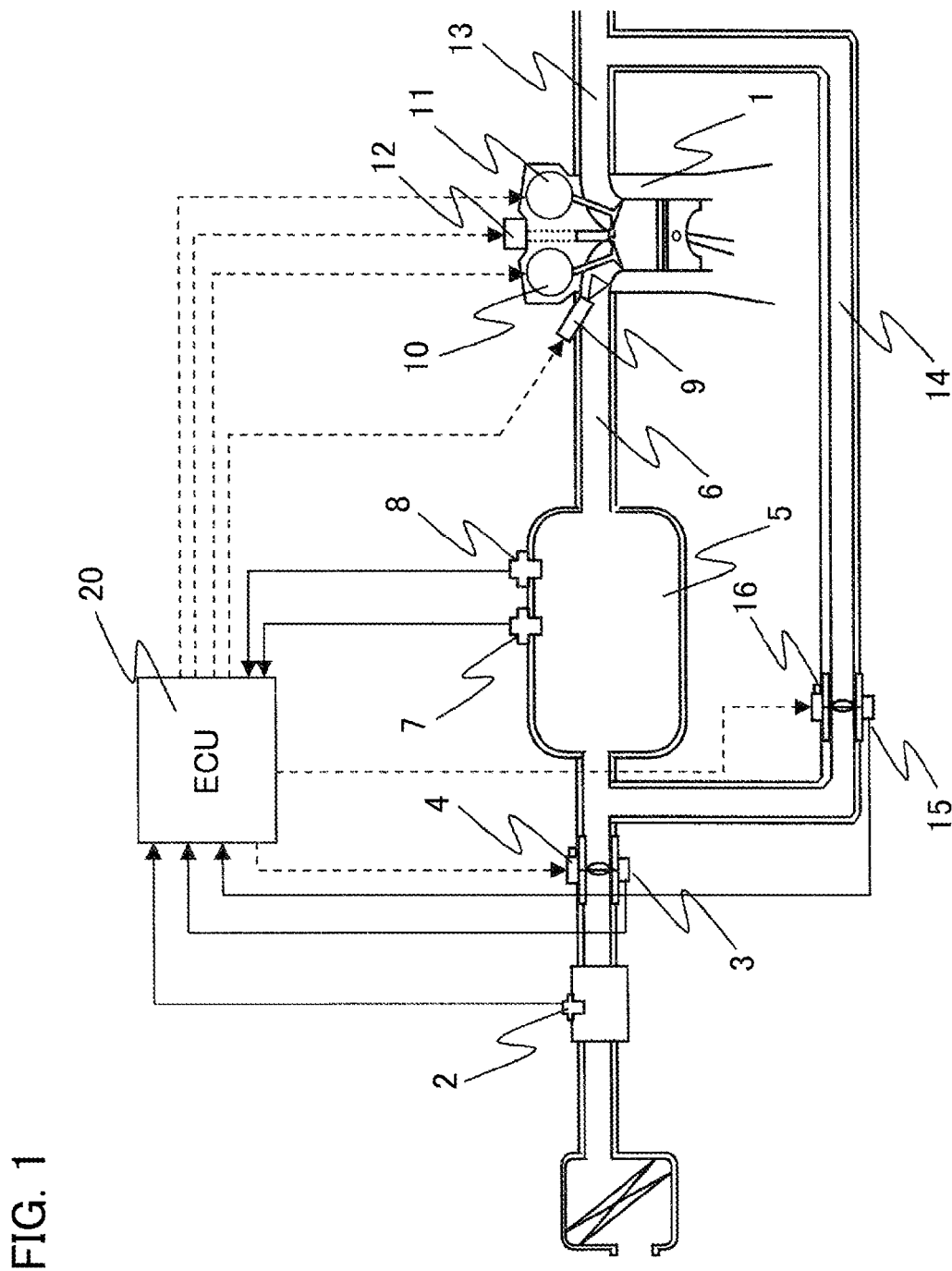
FIG. 1 is a configuration diagram schematically illustrating an internal combustion engine EGR flow rate estimation apparatus according to Embodiment 1 of the present invention and an internal combustion engine to which a control apparatus provided with the EGR flow rate estimation apparatus is applied.
Figure 2:
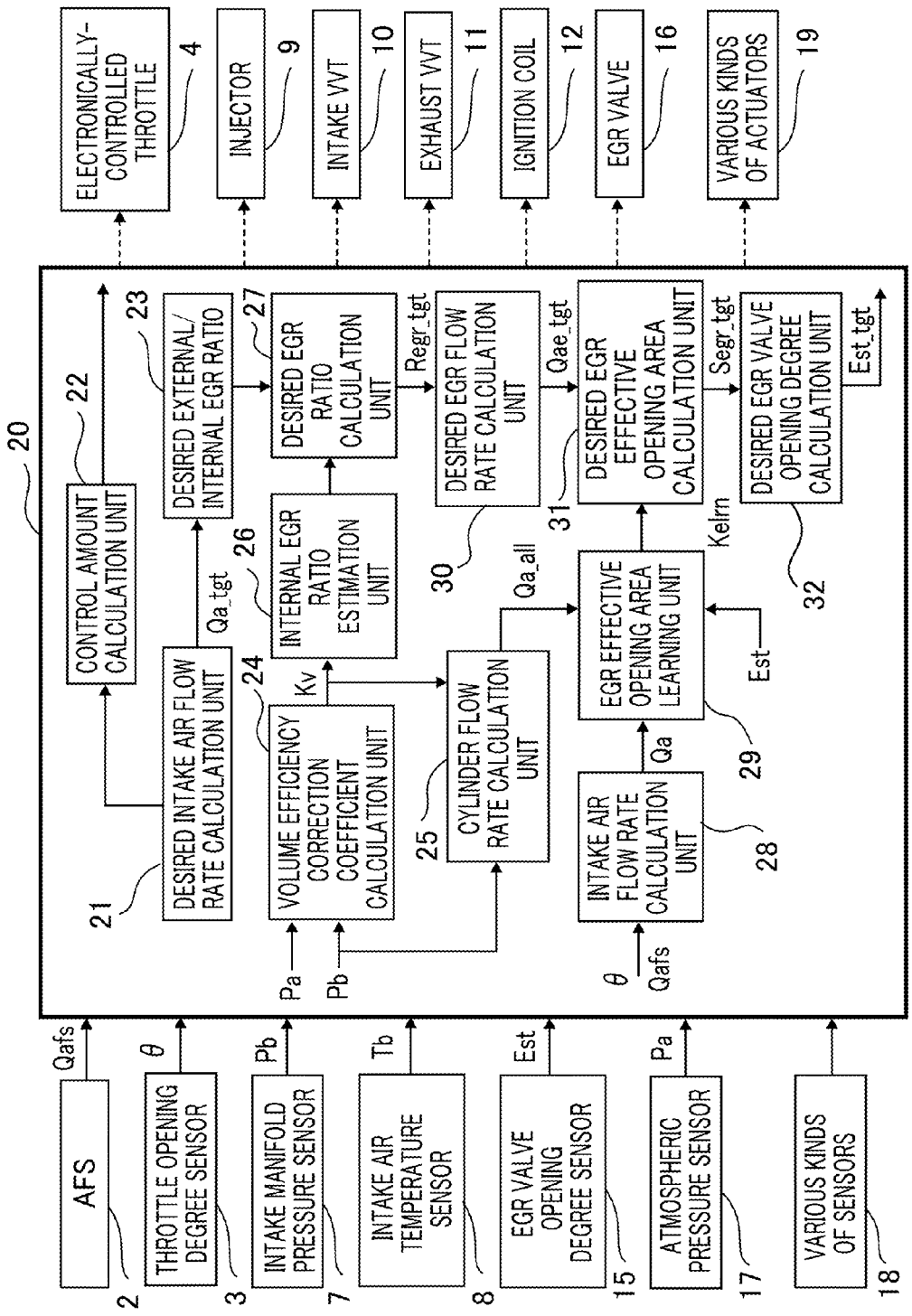
FIG. 2 is a block diagram illustrating an internal combustion engine control apparatus provided with the internal combustion engine EGR flow rate estimation apparatus according to Embodiment 1 of the present invention.

Hereinafter, an internal combustion engine EGR flow rate estimation apparatus and an internal combustion engine control apparatus according to Embodiment 1 of the present invention will be explained in detail with reference to the drawings. FIG. 1 is a configuration diagram schematically illustrating an internal combustion engine to which an internal combustion engine control apparatus provided with an internal combustion engine EGR flow rate estimation apparatus according to Embodiment 1 of the present invention is applied; FIG. 2 is a block diagram illustrating an internal combustion engine control apparatus provided with the internal combustion engine EGR flow rate estimation apparatus according to Embodiment 1 of the present invention. In FIG. 1, at the upstream side of an intake pipe, as an air-intake path, included in the intake system of an internal combustion engine 1, there is provided an electronically-controlled throttle 4, as a throttle valve, that can electrically be controlled, so as to adjust an intake air flow rate. In order to measure the opening degree of the electronically-controlled throttle 4, a throttle opening degree sensor 3 is provided.

At the upstream side of the throttle 4 in the intake pipe, an AFS 2 is provided. An atmospheric pressure sensor 17 (refer to FIG. 2) for measuring the temperature of atmospheric air is incorporated in the AFS 2. At the downstream side of the electronically-controlled throttle 4, there are provided an intake manifold pressure sensor 7, as an intake pipe pressure detection unit, that measures the pressure inside the intake manifold, which is a space including a surge tank 5 and an intake manifold 6, and an intake air temperature sensor 8 that measures the temperature inside the intake manifold.

It may also be allowed that instead of providing the intake air temperature sensor 8 that measures an inner-intake-manifold temperature, a temperature sensor, such as the atmospheric pressure sensor 17 included in the AFS 2, that approximately measures the outer air is utilized and the inner-intake-manifold temperature is estimated from the temperature of the outer air, although strictly speaking, the estimated temperature differs from the temperature measured by use of the intake air temperature sensor 8. In contrast, it may also be allowed that instead of the atmospheric air temperature sensor 17, the intake air temperature sensor 8 is utilized so that the atmospheric air temperature is estimated from an inner-intake-manifold temperature Tb.

An injector 9 for injecting a fuel is provided in the vicinity of the intake valve including the intake manifold 6 and the inside of the cylinder of the internal combustion engine 1; an intake VVT 10 and an exhaust VVT 11 for changing the valve timing are provided in the intake valve and the exhaust valve, respectively; an ignition coil 12 for driving an ignition plug that produces a spark in the cylinder is provided on the cylinder head.

An O₂ sensor and a catalyst, which are not illustrated, are provided in an exhaust manifold 13 that forms the exhaust path of the internal combustion engine 1 along with the exhaust pipe. The exhaust manifold 13 and the surge tank 5 are connected with each other by an exhaust gas recirculation path (hereinafter, referred to as an EGR path) 14. An exhaust gas recirculation valve (referred to as an EGR valve, hereinafter) 16 for controlling an exhaust gas recirculation amount (referred to as an EGR flow rate, hereinafter) is provided in the EGR path 14; in order to measure the opening degree of the EGR valve 16, an EGR valve opening degree sensor 15 is provided therein.

In FIG. 2, an intake air flow rate Qafs measured by the AFS 2, an opening degree θ of the electronically-controlled throttle 4 measured by the throttle opening degree sensor 3, an inner-intake-manifold pressure Pb measured by the intake manifold pressure sensor 7, an inner-intake-manifold temperature Tb measured by the intake air temperature sensor 8, an opening degree Est of the EGR valve 16 measured by the EGR valve opening degree sensor 15, and an atmospheric pressure Pa measured by the atmospheric pressure sensor 17 are inputted to an electronic control unit (referred to as an ECU (Electric Control Unit), hereinafter) 20. Instead of the atmospheric pressure sensor 17 for measuring an atmospheric pressure, either a unit for estimating the atmospheric pressure or an atmospheric pressure sensor incorporated in the ECU 20 may be utilized. Measurement values are also inputted to the ECU 20 from various kinds of sensors (including an accelerator opening degree sensor and a crank angle sensor, which are unillustrated).

The ECU 20 is provided with a desired intake air flow rate calculation unit 21, a control amount calculation unit 22, a desired external/internal EGR ratio estimation unit 23, a volume efficiency correction coefficient calculation unit 24, a cylinder flow rate calculation unit 25, an internal EGR ratio estimation unit 26, a desired EGR ratio calculation unit 27, an intake air flow rate calculation unit 28, an EGR effective opening area learning unit 29, a desired EGR flow rate calculation unit 30, a desired EGR effective opening area calculation unit 31, and a desired EGR valve opening degree calculation unit 32.

The desired torque calculation unit (unillustrated) in the ECU 20 calculates desired torque Pi_tgt of the internal combustion engine 1, based on various kinds of information items from various kinds sensors 18 and opening degree θ and the like, of the electronically-controlled throttle 4, that correspond to the opening degree of the accelerator and are sent from the throttle opening degree sensor 3. The desired intake air flow rate calculation unit 21 calculates a desired intake air flow rate Qa_tgt, based on the calculated desired torque Pi_tgt. The control amount calculation unit 22 calculates an intake VVT desired phase angle IVT and an exhaust VVT desired phase angle EVT, as the intake/exhaust VVT control amount, by use of the desired intake air flow rate Qa_tgt calculated by the desired intake air flow rate calculation unit 21. The desired external/internal EGR ratio estimation unit 23 calculates a desired external EGR ratio Regrex_t and a desired internal EGR ratio Regrin_t, by use of the desired intake air flow rate Qa_tgt calculated by the desired intake air flow rate calculation unit 21 and an internal combustion engine rotation speed Ne.

Based on the VVT control of at least one of the intake valve and the exhaust valve of the internal combustion engine, the volume efficiency correction coefficient calculation unit 24 calculates a volume efficiency correction coefficient Kv, as a volume efficiency corresponding value which is an index for indicating the amount of air that flows from the intake pipe at the downstream side of the throttle valve into the cylinder of the internal combustion engine. The cylinder flow rate calculation unit 25 calculates a cylinder flow rate Qa_all by use of the volume efficiency correction coefficient Kv calculated by the volume efficiency correction coefficient calculation unit 24, the inner-intake-pipe pressure Pb obtained through the intake manifold pressure sensor 7, and the inner-intake-manifold temperature Tb obtained through the intake air temperature sensor 8. The internal EGR ratio estimation unit 26 calculates an internal EGR ratio Regrin by use of the volume efficiency correction coefficient Kv calculated by the volume efficiency correction coefficient calculation unit 24.

The desired EGR ratio calculation unit 27 calculates an internal-EGR-ratio desired value/real value difference ΔRegrin by use of the internal EGR ratio Regrin calculated by the internal EGR ratio estimation unit 26 and the desired internal EGR ratio Regrin_t calculated by the desired external/internal EGR ratio estimation unit 23; then, the desired EGR ratio calculation unit 27 calculates an desired EGR ratio Regr_tgt by use of the internal-EGR-ratio desired value/real value difference ΔRegrin and the desired external EGR ratio Regrex_t calculated by the desired external/internal EGR ratio estimation unit 23.

The intake air flow rate calculation unit 28 calculates an intake air flow rate Qa by use of the intake air flow rate Qafs measured by the AFS 2 or the throttle flow rate Qth. In this situation, the throttle flow rate Qth is calculated by use of a throttle effective opening area Sth_ctl calculated based on the throttle opening degree θ obtained through the throttle opening degree sensor 3 and a throttle opening degree learning value θlrn. The throttle opening degree learning value θlrn is calculated from the throttle opening degree θ and the throttle effective opening area Sth to be calculated based on the cylinder flow rate Qa_all calculated by the cylinder flow rate calculation unit 25.

The EGR effective opening area learning unit 29 calculates the EGR flow rate Qae by use of the cylinder flow rate Qa_all calculated by the cylinder flow rate calculation unit 25 and the intake air flow rate Qa calculated by the intake air flow rate calculation unit 28, calculates the EGR effective opening area Segr from the calculated EGR flow rate Qae and the inner-intake-manifold temperature Tb obtained through the intake air temperature sensor 8, calculates the EGR base effective opening area Segr_bse from the EGR valve opening degree Est obtained through the EGR valve opening degree sensor 15, and further calculates the EGR effective opening area learning value Kelrn by use of the EGR effective opening area Segr and the EGR base effective opening area Segr_bse.

The calculated EGR effective opening area learning value Kelrn is stored in a learning region in accordance with the EGR valve opening degree Est. The EGR effective opening area learning unit 29 calculates a learning control EGR effective opening area Segr_ctl from the stored EGR effective opening area learning value Kelrn and the EGR base effective opening area Segr_bse.

The desired EGR flow rate calculation unit 30 calculates a desired EGR flow rate Qae_tgt by use of the desired intake air flow rate Qa_tgt calculated by the desired intake air flow rate calculation unit 21 and the desired EGR ratio Regr_tgt calculated by the desired EGR ratio calculation unit 27. The desired EGR effective opening area calculation unit 31 calculates a desired EGR effective opening area Segr_tgt, based on the desired EGR flow rate Qae_tgt calculated by the desired EGR flow rate calculation unit 30. The desired EGR valve opening degree calculation unit 32 calculates a desired EGR valve opening degree Est_tgt by use of the desired EGR effective opening area Segr_tgt calculated by the desired EGR effective opening area calculation unit 31 and the EGR effective opening area learning value Kelrn calculated by the EGR effective opening area learning unit 29.

By applying F/B control to the desired EGR valve opening degree Est_tgt calculated based on the desired EGR ratio Regr_tgt and the intake VVT desired phase angle IVT and the exhaust VVT desired phase angle EVT calculated by the control amount calculation unit 22, the ECU 20 performs correction in such a way that the total EGR ratio becomes constant, and controls the EGR valve 16, the intake VVT 10, and the exhaust VVT 11 in such a way that they collaborate with one another.

AS described above, based on the inputted various kinds of data items such as the opening degree θ of the electronically-controlled throttle 4 and the like, that correspond to the accelerator opening degree, the desired torque Pi_tgt of the internal combustion engine 1 is calculated, and the desired intake air flow rate Qa_tgt for achieving the desired torque Pi_tgtis is calculated; then, the desired throttle opening degree, the intake VVT desired phase angle IVT, and the exhaust VVT desired phase angle EVT for achieving the desired intake air flow rate Qa_tgt are calculated. Then, by use of these values as the desired values, the ECU 20 controls the opening degree of the electronically-controlled throttle 4 and the phase angles of the intake VVT 10 and the exhaust VVT 11, concurrently drives the injector 9, the ignition coil 12, and the like, and also controls other various kinds of actuators 19, as may be necessary.

Figure 3:
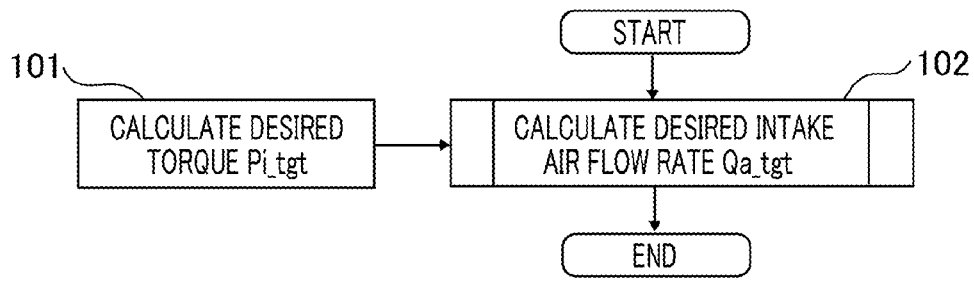
FIG. 3 is a flowchart representing the procedure for calculating a desired intake air flow rate in the internal combustion engine EGR flow rate estimation apparatus according to Embodiment 1 of the present invention.
Figure 4:
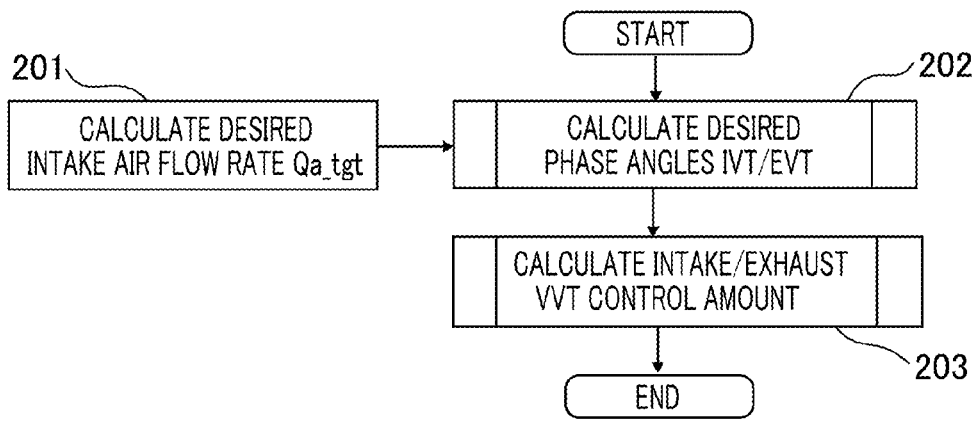
FIG. 4 is a flowchart representing the procedure for calculating an intake/exhaust VVT control amount in the internal combustion engine EGR flow rate estimation apparatus according to Embodiment 1 of the present invention.

Next, processing items to be implemented by the desired intake air flow rate calculation unit 21 and the control amount calculation unit 22 in the ECU 20 illustrated in FIG. 2 will be explained in detail with reference to the flowcharts, represented in FIGS. 3 and 4, for representing that the foregoing processing items are implemented in predetermined-timing interruption processing (e.g., 10-ms main processing or BTDC 75-degCA interruption processing). FIG. 3 is a flowchart representing the procedure for calculating a desired intake air flow rate in the EGR flow rate estimation apparatus according to Embodiment 1 of the present invention; FIG. 4 is a flowchart representing the procedure for calculating an intake/exhaust VVT control amount in the internal combustion engine EGR flow rate estimation apparatus according to Embodiment 1 of the present invention.

The step 102 in the flowchart represented in FIG. 3 is implemented by the desired intake air flow rate calculation unit in FIG. 2. In the step 101 in FIG. 3, a desired torque calculation unit (unillustrated) calculates the desired torque Pi_tgt, based on the inputted various kinds of data items such as the throttle opening degree θ corresponding to the accelerator opening degree and the like. In the step 102, the desired intake air flow rate Qa_tgt for achieving the desired torque Pi_tgt calculated in the step 101 is calculated.

Next, the steps 202 and 203 in the flowchart represented in FIG. 4 are implemented by the control amount calculation unit 22 in FIG. 2. In FIG. 4, the step 201 corresponds to the step 102 in FIG. 3; as described above, the desired intake air flow rate calculation unit 21 calculates the desired intake air flow rate Qa_tgt. Next, in the step 202, the intake VVT desired phase angle IVT and the exhaust VVT desired phase angle EVT, as the intake/exhaust VVT control amount are calculated based on the calculated desired intake air flow rate Qa_tgt. The processing in the step 202 corresponds to the processing in a desired phase angle calculation unit. In the step 203, the intake/exhaust VVT control amount is calculated based on the intake VVT desired phase angle IVT and the exhaust VVT desired phase angle EVT that have been calculated in the step 202. Then, based on the intake/exhaust VVT control amount, the phase angles of the intake VVT 10 and the exhaust VVT 11 are controlled.

In the case of conventional intake/exhaust VVT control, the intake VVT desired phase angle IVT and the exhaust VVT desired phase angle EVT are calculated from a detected intake air flow rate Qa; therefore, it is conceivable that there exists a problem that because after the intake air flow rate Qa changes, the intake VVT 10 and the exhaust VVT 11 start to operate, the responsiveness is deteriorated. Ideally, better responsiveness can be obtained in the case where when the desired intake air flow rate Qa_tgt changes, not only the throttle opening degree but also the phase angles of the intake VVT 10 and the exhaust VVT 11 change.

Accordingly, in the EGR flow rate estimation apparatus of the internal combustion engine control apparatus according to Embodiment 1 of the present invention, the intake VVT desired phase angle IVT and the exhaust VVT desired phase angle EVT, which have conventionally been calculated from the intake air flow rate Qa, are calculated based on the desired intake air flow rate Qa_tgt.

Next, the desired external/internal EGR ratio estimation unit 23 illustrated in FIG. 2 will be explained in detail. In each of the cases where there is utilized the external EGR method in which the EGR amount is controlled by the opening degree of the EGR valve 16, where there is utilized the internal EGR method in which the opening/closing timings for the intake valve and the exhaust valve are changed by the VVT and the overlap period, in which the intake valve and the exhaust valve are concurrently opened, is changed based on the valve opening/closing timing so that the EGR amount, which is caused because exhaust gas remains in a cylinder, is controlled, and where the external EGR method and the internal EGR method are concurrently utilized, when the EGR amount conforms to the respective optimum values, the rotation speed Ne of the internal combustion engine 1, the intake air flow rate Qa, the internal EGR ratio, and the external EGR ratio, which are indexes for the conforming parameters, are preliminarily measured. After that, there is created a map (unrepresented) for obtaining the internal EGR ratio and the external EGR ratio for the parameter indexes of the rotation speed Ne of the internal combustion engine 1 and the intake air flow rate Qa.

Instead of the map for obtaining the internal EGR ratio, which is the ratio of the internal EGR flow rate to the intake air flow rate, and the external EGR ratio, which is the ratio of the external EGR flow rate to the intake air flow rate, an arithmetic expression (e.g., a linear function or the like), which is obtained from the relation between the parameter indexes, may be utilized.

Figure 5:
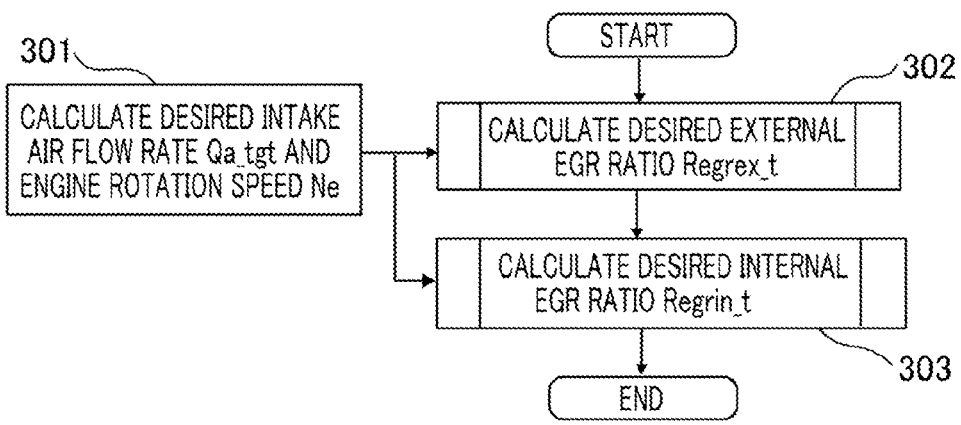
FIG. 5 is a flowchart representing the procedure for calculating a desired external EGR ratio and a desired internal EGR ratio in the internal combustion engine EGR flow rate estimation apparatus according to Embodiment 1 of the present invention.

The rotation speed Ne of the internal combustion engine 1 and the desired intake air flow rate Qa_tgt are inputted to the created map for obtaining the internal EGR ratio and the external EGR ratio, and the desired external EGR ratio and the desired internal EGR ratio are calculated. That is to say, FIG. 5 is a flowchart representing the procedure for calculating a desired external EGR ratio and a desired internal EGR ratio in the internal combustion engine EGR flow rate estimation apparatus according to Embodiment 1 of the present invention. In FIG. 5, in the step 302, the desired intake air flow rate Qa_tgt and the rotation speed Ne of the internal combustion engine 1 obtained in the step 301 are inputted to the foregoing map; then, in the step 302, the desired external EGR ratio is calculated from the map, and in the step 303, the desired internal EGR ratio is calculated from the map.

In the case of conventional external EGR control, the desired external EGR ratio is calculated from a detected intake air flow rate Qa; therefore, it is conceivable that there exists a problem that because after the intake air flow rate Qa changes, the EGR valve 16 starts to operate, the responsiveness is deteriorated. Ideally, better responsiveness can be obtained in the case where when the desired intake air flow rate Qa_tgt changes, not only the throttle opening degree but also the external EGR ratio changes. Thus, in the internal combustion engine control apparatus according to Embodiment 1 of the present invention, the desired external EGR ratio, which has conventionally been calculated from the intake air flow rate Qa, is calculated from the desired intake air flow rate Qa_tgt.

Figures 6, 7:
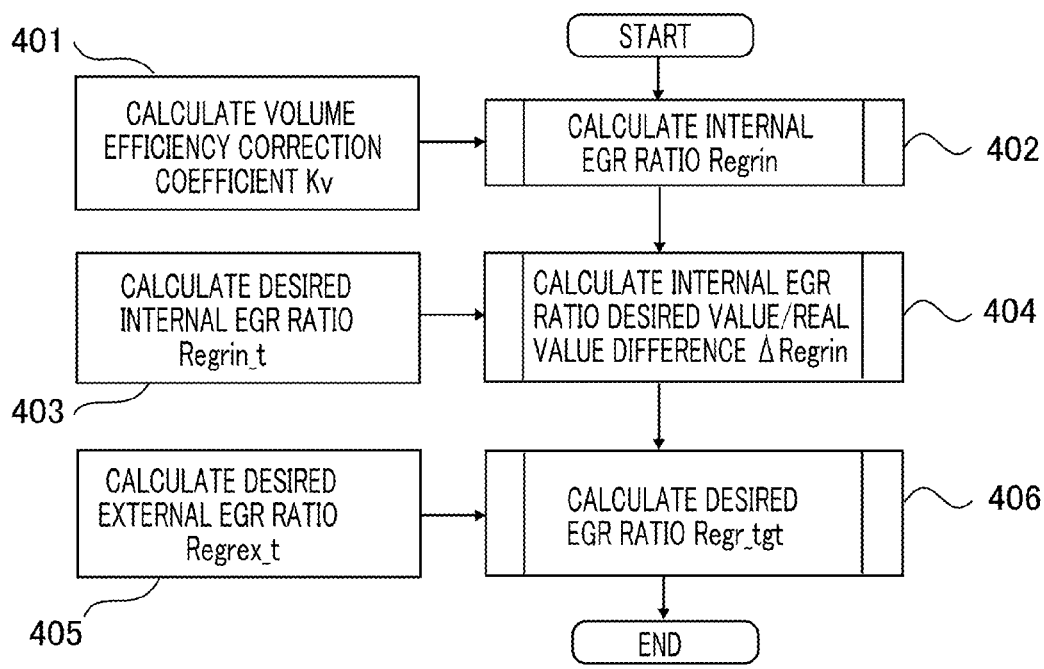
FIG. 6 is a table representing the map for calculating a volume efficiency correction coefficient in the internal combustion engine EGR flow rate estimation apparatus according to Embodiment 1 of the present invention.
FIG. 7 is a flowchart representing the procedure for calculating an internal EGR ratio through a desired EGR ratio in the internal combustion engine EGR flow rate estimation apparatus according to Embodiment 1 of the present invention.

Next, the details of the volume efficiency correction coefficient calculation unit 24 illustrated in FIG. 2 will be explained. From, for example, the map represented in FIG. 6, the volume efficiency correction coefficient calculation unit 24 calculates the volume efficiency correction coefficient, based on the internal combustion engine rotation speed Ne and the ratio of the atmospheric pressure Pa to the inner-intake-manifold pressure Pb. That is to say, FIG. 6 is a table representing the map for calculating a volume efficiency correction coefficient in the internal combustion engine EGR flow rate estimation apparatus according to Embodiment 1 of the present invention. In FIG. 6, when the rotation speed Ne of the internal combustion engine is 3000[r/min] and the ratio of the inner-intake-manifold pressure Pb to the atmospheric pressure Pa is 0.6, the volume efficiency coefficient Kv is 0.9.

Because the volume efficiency correction coefficient Kv changes depending on the valve timing, a map corresponding to the change in the VVT is required, in general. When each of the changing ranges of the intake valve and the exhaust valve is from 0 [degCA] to 50 [degCA] and a map is prepared every 10 [degCA], 36 (6×6) maps are required. In general, there are prepared two maps, i.e., a map corresponding to the desired valve timing depending on the driving condition and a map at a time when the VVT does not operate. It goes without saying that volume efficiency correction coefficient may be obtained not through a map but through calculation.

Next, the details of the cylinder flow rate calculation unit 25 illustrated in FIG. 2 will be explained. Based on the volume efficiency correction coefficient Kv calculated by the volume efficiency correction coefficient calculation unit 24 and the inner-intake-manifold pressure Pb obtained through the intake manifold pressure sensor 7, the cylinder flow rate calculation unit 25 calculates the cylinder flow rate Qa_all in accordance with the equation (1) below. The cylinder flow rate Qa_all and the volume efficiency correction coefficient Kv are given by the equation (1) below; therefore, when the volume efficiency correction coefficient Kv has been calculated, the cylinder flow rate Qa_all can be calculated.

$$Qa\_all = \frac{Pb \cdot Vc \cdot Kv}{T(n) \cdot R \cdot (Tb + 273)} \qquad (1)$$

where Qa_all, Vc, T(n), and R are the cylinder flow rate[g/s], the cylinder volume[L], the every-180° crank angle period[s], and the gas constant[kJ/(kg·K)], respectively.

Next, processing items to be implemented by the internal EGR ratio estimation unit 26 and the desired EGR ratio calculation unit 27 in the ECU 20 illustrated in FIG. 2 will be explained in detail with reference to the flowchart, represented in FIG. 7, for representing that the foregoing processing items are implemented in predetermined-timing interruption processing (e.g., 10-ms main processing or BTDC 75-degCA interruption processing). FIG. 7 is a flowchart representing the procedure for calculating an internal EGR rate through a desired EGR rate in the internal combustion engine EGR flow rate estimation apparatus according to Embodiment 1 of the present invention. The step 401 in the flowchart represented in FIG. 7 is implemented by the volume efficiency correction coefficient calculation unit 24 in FIG. 2; the step 402 is implemented by the internal EGR ratio estimation unit 26 in FIG. 2.

In the step 402 in the flowchart represented in FIG. 7, the internal EGR ratio Regrin is calculated based on the volume efficiency correction coefficient Kv obtained in the step 401. The equation representing the relationship between the volume efficiency correction coefficient Kv and the internal EGR ratio Regrin is defined by the equation (2) below.

$$Kv = K_{in} \cdot \left( \frac{\varepsilon}{\varepsilon - 1} - K_{ex} \cdot \frac{1}{\varepsilon - 1} \right), R_{egrin} = \frac{K_{ex}}{\varepsilon} \qquad (2)$$

where Kin and Kex are an intake efficiency and an exhaust efficiency, respectively.

Kin and Kex are defined by the equation (3) below (ε: compression ratio).

$$K_{in} = \frac{p_{in}}{p_b} \cdot \frac{T_b}{T_{in}}, K_{ex} = \frac{V_{ex}}{V_{min}} \cdot \frac{p_{ex}}{p_{in}} \cdot \frac{T_{in}}{T_{ex}} \qquad (3)$$

where Vex, Vmin, P, and T are the deemed residual gas volume 1 (the volume of residual gas at a time when the inner-exhaust-manifold pressure and temperature are Pex and Tex, respectively)[L], the gap capacity[L], the pressure [kPa], and the temperature[K], respectively; the subscripts b, in, and ex are "inner-intake-manifold", "inner-cylinder @B180 (at the end of air-intake stroke)", and "inner-exhaust-manifold", respectively.

Although the relationship between the volume efficiency correction coefficient Kv and the internal EGR ratio Regrin is represented by the forgoing equation (2), the EGR ratio is the ratio of the EGR flow rate to the intake air flow rate, which is the flow rate of fresh air; thus, by solving the equation (2) for the internal EGR ratio Regrin while considering that the internal EGR ratio is the ratio of the internal EGR flow rate to the intake air flow rate, the equation (4) below is given.

$$R_{egrin} = \frac{K \cdot \frac{\varepsilon}{\varepsilon - 1}}{Kv} - 1 \qquad (4)$$

As can be seen from the equation (4), the internal EGR ratio Regrin is calculated based on the volume efficiency correction coefficient Kv and the intake efficiency Kin.

The steps 403 through 406 in the flowchart represented in FIG. 7 are implemented by the desired EGR ratio calculation unit 27 in FIG. 2. In the step 404 in FIG. 7, based on the desired internal EGR ratio Regrin_t obtained in the step 403

(corresponding to the step 303 in FIG. 5) and the internal EGR ratio Regrin obtained in the step 402, the internal-EGR-ratio desired value/real value difference ΔRegrin is calculated by the equation (5) below.

$$\Delta Regrin = Regrin\_t - Regrin \quad (5)$$

In the step 406, based on the desired external EGR ratio Regrex_t obtained in the step 405 and the internal-EGR-ratio desired value/real value difference ΔRegrin obtained in the step 404 (corresponding to the step 302 in FIG. 5), the desired EGR ratio Regr_tgt is calculated by the equation (6) below.

$$Regr\_tgt = \Delta Regrin + Regrex\_tgt \quad (6)$$

Addition of the internal-EGR-ratio desired value/real value difference ΔRegrin, which is the difference between the internal EGR ratio desired value and the internal EGR ratio real value, to the desired external EGR ratio Regrex_t makes the difference between the desired value and the real value of the internal EGR ration directly absorbed by the external EGR ratio and hence the total EGR ratio becomes constant. In other words, external EGR control may be performed by use of the desired EGR ratio Regr_tgt in such a way as to achieve the total EGR ratio consisting of the internal EGR ratio and the external EGR ratio.

Figure 8:
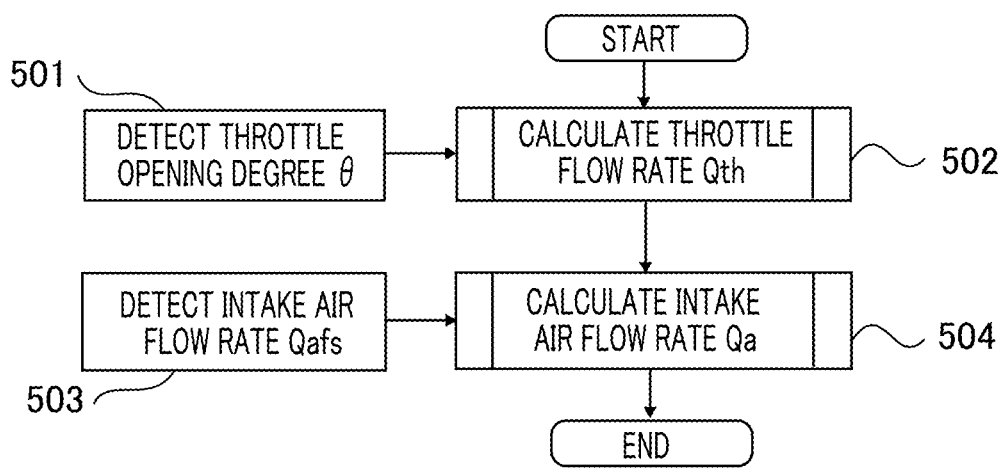
FIG. 8 is a flowchart representing the procedure for calculating an intake air flow rate in the internal combustion engine control apparatus according to Embodiment 1 of the present invention.
Figure 9:
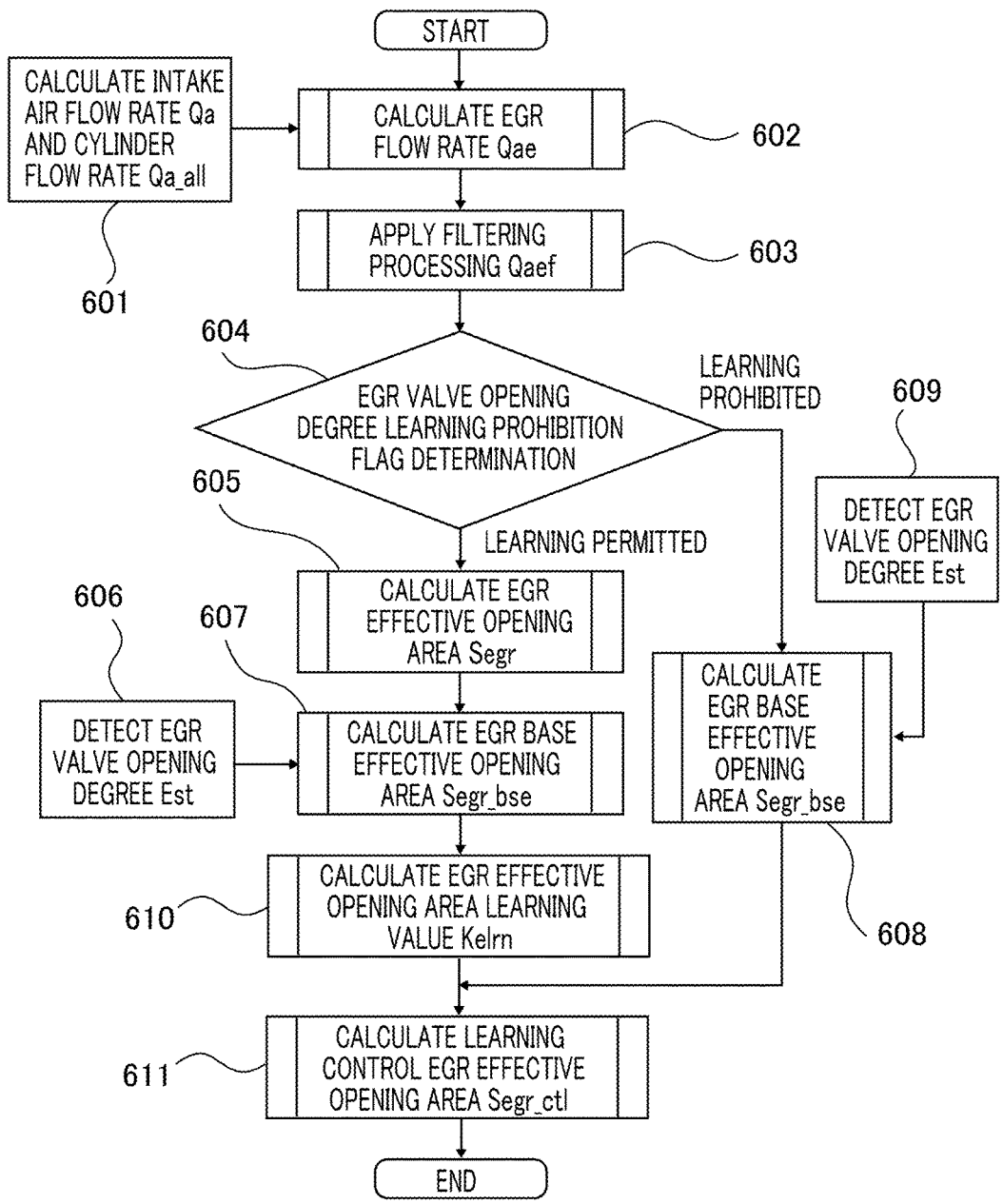
FIG. 9 is a flowchart representing the procedure for implementing EGR effective opening area learning in the internal combustion engine EGR flow rate estimation apparatus according to Embodiment 1 of the present invention.

Next, processing items to be implemented by the intake air flow rate calculation unit 28 and the EGR effective opening area learning unit 29 in the ECU 20 illustrated in FIG. 2 will be explained in detail with reference to the flowcharts, represented in FIGS. 8 and 9, for representing that the foregoing processing items are implemented in predetermined-timing interruption processing (e.g., 10-ms main processing or BTDC 75-degCA interruption processing). FIG. 8 is a flowchart representing the procedure for calculating an intake air flow rate in the internal combustion engine EGR flow rate estimation apparatus according to Embodiment 1 of the present invention; FIG. 9 is a flowchart representing the procedure for implementing EGR effective opening area learning in the internal combustion engine EGR flow rate estimation apparatus according to Embodiment 1 of the present invention. The steps 501 through 504 in the flowchart represented in FIG. 8 are implemented by the intake air flow rate calculation unit 28 in FIG. 2.

In FIG. 8, the throttle flow rate Qth is calculated in the step 502 based on the throttle opening degree θ to be detected, in the step 501, based on a signal from the throttle opening degree sensor 3. In this situation, the calculation of the throttle flow rate Qth based on the throttle opening degree θ is implemented in the following manner. That is to say, at first, the control throttle effective opening area Sth_ctl is calculated based on the throttle opening degree θ. The control throttle effective opening area Sth_ctl can be calculated from the throttle opening degree θ in the control throttle opening degree θctl vs. throttle effective opening area Sth characteristic.

The relationship between the control throttle effective opening area Sth_ctl and the throttle flow rate Qth can be represented by the equation (7) below.

$$Qth = \frac{Sth\_ctl}{\alpha_a \cdot \sigma_a \cdot \rho_a} \quad (7)$$

where Qth, Sth_ctl, αa, σa, and ρa are the throttle flow rate [g/s], the control throttle effective opening area [mm²], the inner-intake-pipe (atmospheric) sonic velocity [m/s], the dimensionless flow rate [g/s], and the inner-intake-pipe (atmospheric) density, respectively.

Because the relationship between the throttle flow rate Qth and the control throttle effective opening area Sth_ctl, given by the equation (7), is established, the throttle flow rate Qth is obtained when the respective constants αa, σa, and ρa are obtained. In the step 504, the intake air flow rate Qa is calculated based on the intake air flow rate Qafs detected by the AFS 2 in the step 503 or the throttle flow rate Qth calculated in the step 502.

Next, in FIG. 9, the steps 601 through 611 are implemented by the EGR effective opening area learning unit 29 in FIG. 2. In the step 602, the EGR flow rate Qae is calculated based on the cylinder flow rate Qa_all and the intake air flow rate Qa calculated in the step 601. In other words, the difference between the cylinder flow rate Qa_all and the intake air flow rate Qa, obtained in the step 601, is the EGR flow rate Qae. The step 602 corresponds to the processing in the EGR flow rate calculation unit.

In the step 603, filtering processing (for example, first-order-lag filter processing) is applied to the calculated EGR flow rate Qae. In many cases, minute measurement noise intrudes in the output value of the intake manifold pressure sensor 7 utilized in the calculation through the equation (1); thus, in the case where the EGR flow rate Qae is calculated by use of the cylinder flow rate Qa_all obtained through the equation (1), an error may occur. However, the noise components can be attenuated by applying filtering processing to the EGR flow rate Qae. The EGR flow rate Qae, the measurement noise components in which have been reduced, is utilized, so that the effect of a minute detection error included in the intake manifold pressure sensor 7 can be eliminated; thus, the calculations thereafter can be implemented.

The filtering processing to be applied to the foregoing EGR flow rate Qae is implemented in accordance with the equation (8) below.

$$Qaef(n) = K_1 \cdot Qaef(n-1) + (1-K_1) \cdot Qae(n) \quad (8)$$

where Qaef(n), Qae(n), Qaef(n−1), and K1 are the filtered EGR flow rate[g/s], the present EGR flow rate[g/s], the immediately previous EGR flow rate[g/s], and the filter constant (for example, a value approximately between 0.9 and 0.99 is utilized), respectively.

In the step 604, it is determined whether or not EGR valve opening degree learning is prohibited. In the case where the learning is permitted, the step 604 is followed by the step 605; in the case where the learning is prohibited, the step 604 is followed by the step 608. The condition under which the EGR valve opening degree learning is prohibited is, for example, that the environmental condition such as the water temperature is inappropriate, that the present time point is in the steady driving region or at a point when a predetermined time has elapsed after a transient driving, that the EGR valve opening degree is changing, that there exists a difference between the desired value of the VVT and the control value thereof, or the like; in the case where the EGR valve opening degree learning is prohibited, an EGR valve opening degree learning prohibition flag is set.

In the step 605, based on the EGR flow rate Qae, the EGR effective opening area Segr is calculated through the equation (9) below.

$$Segr = \frac{Qae}{\alpha_a \cdot \sigma_a \cdot \rho_a} \quad (9)$$

where Segr, Qae, αe, σe, and ρe are the EGR effective opening area [mm²], the EGR flow rate [g/s], the inner-exhaust-pipe sonic velocity [m/s], the dimensionless flow rate, and the inner-exhaust-pipe density, respectively.

Because the relationship between the EGR effective opening area Segr and the EGR flow rate Qae, given by the foregoing equation (9), is established, the EGR effective opening area Segr is obtained when the respective constants are obtained. The inner-exhaust-pipe sonic velocity constant αe, which is a constant, is defined by the equation (10) below.

$$\alpha_e = \sqrt{\kappa \cdot R \cdot Tex} \qquad (10)$$

where κ, R, and Tex are the specific heat ratio (1.4, when the gas is air), the gas constant[kJ/(kg·K)], and the inner-exhaust-pipe temperature, respectively.

The inner-exhaust-pipe temperature Tex in the equation (10) may be measured by a temperature sensor provided in the exhaust pipe or may be calculated, for example, from a map representing the relationship between the internal combustion engine rotation speed Ne and an internal combustion engine filling efficiency Ec (calculated from the intake air flow rate). Because the inner-exhaust-pipe sonic velocity αe is a function of the exhaust gas temperature, it may be allowed that the calculation through the equation (10) is not performed in the ECU 20 and as a map regarding the temperature, results of preliminarily performed calculation are prepared. Because being the constant corresponding to a gas, the gas constant R is preliminarily defined. That is to say, the composition of the gas in the exhaust pipe changes depending on the combustion condition; however, for the sake of simplicity, the gas constant R may be set to the gas constant of air; alternatively, it may be allowed that the combustion condition of the internal combustion engine 1 is estimated and then the gas constant R is considered to be variable.

The inner-exhaust-pipe sonic velocity constant αe, which is a constant, is defined by the equation (11) below.

$$\sigma_e = \sqrt{\frac{2}{\kappa-1}\left[\left(\frac{Pb}{Pex}\right)^{\frac{2}{\kappa}} - \left(\frac{Pb}{Pex}\right)^{\frac{\kappa+1}{\kappa}}\right]} \qquad (11)$$

where κ, Pb, and Pex are the specific heat ratio (1.4, when the gas is air), the inner-intake-manifold pressure [kPa], and the inner-exhaust-pipe pressure [kPa], respectively.

The inner-exhaust-pipe temperature Pex in the equation (11) may be measured by a pressure sensor provided in the exhaust pipe or may be calculated, for example, from a map representing the relationship between the internal combustion engine rotation speed Ne and the internal combustion engine filling efficiency Ec (calculated from the intake air flow rate). Because the dimensionless flow rate σe is a function of the ratio of the inner-exhaust-pipe pressure Pex to the inner-intake-manifold pressure Pb, it may be allowed that the calculation through the equation (11) is not performed in the ECU and as a map regarding the ratio of the inner-exhaust-pipe pressure Pex to the inner-intake-manifold pressure Pb, results of preliminarily performed calculation are prepared.

The inner-exhaust-pipe temperature ρe, which is a constant, is defined by the equation (12) below.

$$\rho_e = \frac{Pex}{R \cdot Tex} \qquad (12)$$

where Pex, R, and Tex are the inner-exhaust-pipe pressure [kPa], the gas constant[kJ/(kg·K)], and the inner-exhaust-pipe temperature, respectively.

The inner-exhaust-pipe temperature Tex in the equation (12) may be measured by a temperature sensor provided in the exhaust pipe or may be calculated, for example, from a map representing the relationship between the internal combustion engine rotation speed Ne and an internal combustion engine filling efficiency Ec (calculated from the intake air flow rate). The inner-exhaust-pipe temperature Pex in the equation (12) may be measured by a pressure sensor provided in the exhaust pipe or may be calculated, for example, from a map representing the relationship between the internal combustion engine rotation speed Ne and the internal combustion engine filling efficiency Ec (calculated from the intake air flow rate).

Although not illustrated in FIG. 2, with regard to the foregoing equations (10), (11) and (12), there are provided an inner-exhaust-pipe temperature detection unit that detects the inner temperature of the exhaust pipe provided in the EGR path, an inner-exhaust-pipe pressure detection unit that detects the inner pressure of the exhaust pipe in the EGR path, an inner-exhaust-pipe sonic velocity calculation unit that calculates the inner-exhaust-pipe sonic velocity, based on the inner-exhaust-pipe temperature, and an inner-exhaust-pipe density calculation unit that calculates the inner-exhaust-pipe density, based on the inner-exhaust-pipe pressure and temperature.

Next, in the step 607 in FIG. 9, the EGR base effective opening area Segr_bse, which is an EGR effective opening area, is calculated from the EGR valve opening degree Est obtained based on a signal from the EGR valve opening degree sensor 15 in the step 606. For example, a map or the like that represents an EGR valve opening degree vs. effective opening area characteristic is preliminarily prepared. That is to say, for example, FIG. 10 is a table representing the map for the relationship between the EGR valve opening degree and the effective opening area in the internal combustion engine EGR flow rate estimation apparatus according to Embodiment 1 of the present invention. Because as represented in the equation (9), the effective opening area and the flow rate are proportional to each other, the EGR base effective opening area Segr_bse may be calculated from a map representing an EGR valve opening degree vs. flow rate characteristic. As described above, the EGR base effective opening area Segr_bse corresponding to the EGR valve opening degree Est is calculated from a map.

In the step 610 in FIG. 9, the EGR effective opening area learning value Kelrn is calculated based on the EGR base effective opening area Segr_bse calculated in the step 607 and the EGR effective opening area Segr calculated in the step 605. In other words, specifically, the difference between the EGR base effective opening area Segr_bse and the EGR effective opening area Segr is calculated; the difference is the EGR effective opening area learning value Kelrn. Instead of the foregoing difference, any other value such as the ratio of the EGR base effective opening area Segr_bse to the EGR effective opening area Segr may be utilized as long as it indicates the difference between the EGR base effective opening area Segr_bse and the EGR effective opening area Segr.

The EGR effective opening area learning value Kelrn is stored in a learning region corresponding to the EGR valve opening degree Est. The stored EGR effective opening area learning value Kelrn is utilized as it is; alternatively, there is utilized a value obtained by multiplying the EGR effective opening area learning value Kelrn by a predetermined gain or by adding a predetermined gain to the EGR effective opening area learning value Kelrn. FIG. 11 is a table representing the map for the relationship between the EGR valve opening degree and the learning value in the internal combustion engine EGR flow rate estimation apparatus according to Embodiment 1 of the present invention. As represented in FIG. 11, storing the EGR effective opening area learning value Kelrn in the learning region corresponding to the EGR valve opening degree Est makes it possible to perform the learning in detail; thus, even when the learning is prohibited, the EGR flow rate can accurately be calculated. Although the accuracy is deteriorated, it may be allowed that the EGR effective opening area learning value Kelrn calculated in the step 610 is utilized as it is, without being stored in the learning region.

In contrast, in the step 604, as described above, there are determined the environmental condition such as the water temperature and the learning prohibition conditions such as whether or not the present time point is in the steady driving region or at a point when a predetermined time has elapsed after a transient driving, whether or not the EGR valve opening degree is changing, and whether or not there exists a difference between the desired value of the VVT and the control value thereof; in the case where the EGR valve opening degree learning is prohibited and the EGR valve opening degree learning prohibition flag is set, the step 604 is followed by the step 608. In the step 608, as is the case with the step 607, the EGR base effective opening area Segr_bse is calculated based on the EGR valve opening degree Est obtained in the step 609; then, the step 608 is followed by the step 611.

In the step 611, the learning control EGR effective opening area Segr_ctl to be utilized for the control is calculated based on the stored EGR effective opening area learning value Kelrn and the EGR base effective opening area Segr_bse. In this situation, in the case where in the step 610, the EGR effective opening area learning value Kelrn, which is the difference between the EGR base effective opening area Segr_bse and the EGR effective opening area Segr, has been stored, the EGR effective opening area learning value Kelrn is added to the EGR base effective opening area Segr_bse in the step 611 so that the learning control EGR effective opening area Segr_ctl is calculated.

Next, processing items to be implemented by the desired EGR flow rate calculation unit 30, the desired EGR effective opening area calculation unit 31, and the desired EGR valve opening degree calculation unit 32 in the ECU 20 illustrated in FIG. 2 will be explained in detail with reference to the flowchart, represented in FIG. 12, for representing that the foregoing processing items are implemented in predetermined-timing interruption processing (e.g., 10-ms main processing or BTDC 75-degCA interruption processing). That is to say, FIG. 12 is a flowchart representing the procedure for calculating a desired EGR flow rate through a desired EGR valve opening degree in the internal combustion engine EGR flow rate estimation apparatus according to Embodiment 1 of the present invention.

Figure 12:
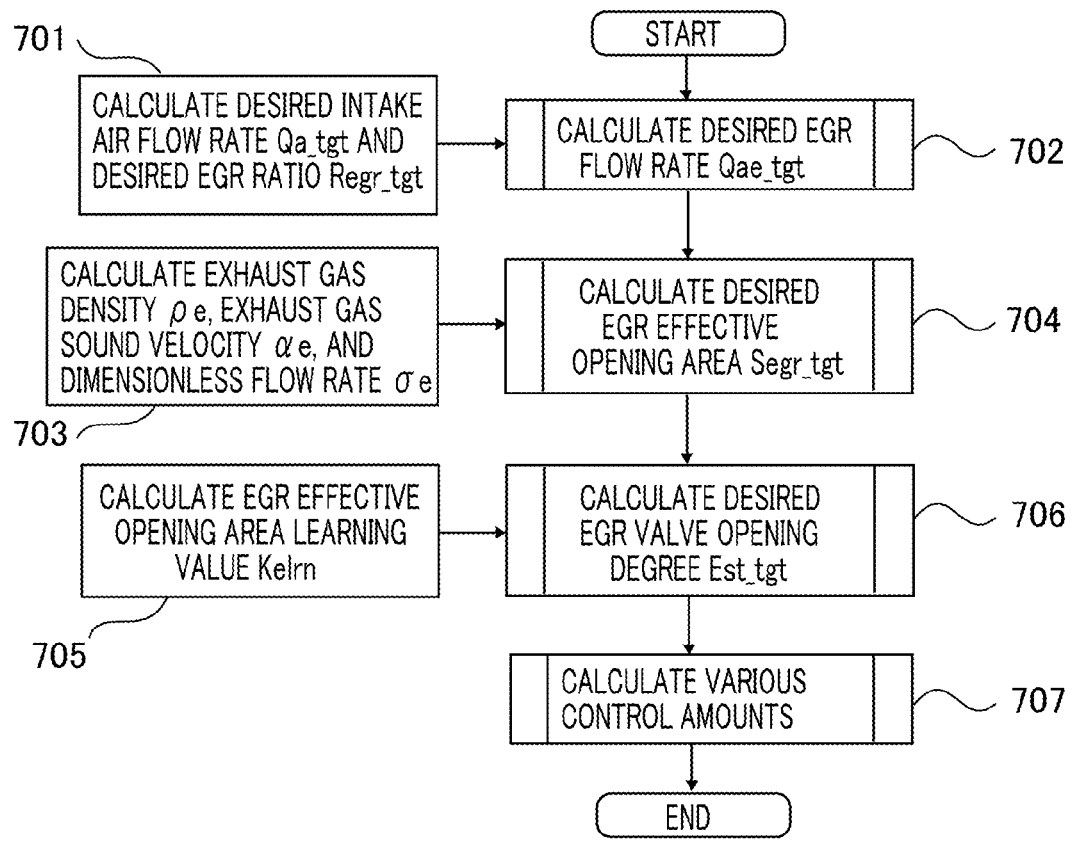
FIG. 12 is a flowchart representing the procedure for calculating a desired EGR flow rate through a desired EGR valve opening degree in the internal combustion engine EGR flow rate estimation apparatus according to Embodiment 1 of the present invention.

The steps 701 and 702 in the flowchart represented in FIG. 12 are implemented by the desired EGR flow rate calculation unit 30 in FIG. 2. In FIG. 12, in the step 702, the desired EGR flow rate Qae_tgt is calculated based on the desired intake air flow rate Qa_tgt calculated in the step 701 and the desired EGR ratio Regr_tgt calculated in the step 406 in FIG. 7. In this situation, the relationship among the desired intake air flow rate Qa_tgt calculated in the step 102 in FIG. 3, the desired EGR ratio Regr_tgt calculated in the step 406 in FIG. 7, and the desired EGR flow rate Qae_tgt is given by the equation (13) below.

$$Qae\_tgt = Regr\_tgt \times Qa\_tgt \quad (13)$$

where Qae_tgt, Qa_tgt, and Regr_tgt are the desired EGR flow rate [g/s], the desired intake air flow rate [g/s], and the desired EGR ratio, respectively.

The steps 703 and 704 in the flowchart represented in FIG. 12 are implemented by the desired EGR effective opening area calculation unit 31 in FIG. 2. In the step 704 in FIG. 12, based on the exhaust gas density ρe, the exhaust gas sound velocity αe, and the dimensionless flow rate σe that are calculated in the step 703 and the desired EGR flow rate Qae_tgt calculated in the step 702, the desired EGR effective opening area Segr_tgt is calculated through the equation (14) below.

$$Segr\_tgt = \frac{Qae\_tgt}{\alpha_a \cdot \sigma_a \cdot \rho_a} \quad (14)$$

where Segr_tgt, Qae_tgt, αe, σe, and ρe are the desired EGR effective opening area [mm$^2$], the desired EGR flow rate [g/s], the inner-exhaust-pipe sonic velocity [m/s], the dimensionless flow rate, and the inner-exhaust-pipe density, respectively.

Because the relationship between the desired EGR effective opening area Segr_tgt and the desired EGR flow rate Qae_tgt, given by the foregoing equation (14), is established, the EGR effective opening area Segr is obtained when the respective constants αe, σe, and ρe are obtained. Because the relationship among the constants αe, σe, and ρe is the same as that given by the foregoing equation (9), they are defined by the equations (10), (11), and (12), respectively.

Next, the steps 705 through 707 in FIG. 12 are implemented by the desired EGR valve opening degree calculation unit 32 in FIG. 2. In the step 706 in FIG. 12, the desired EGR valve opening degree Est_tgt is calculated based on the EGR effective opening area learning value Kelrn calculated in the step 705 and the desired EGR effective opening area Segr_tgt calculated in the step 704. In the step 705 corresponds to the step 610 in FIG. 9.

In the case where the difference between the EGR base effective opening area Segr_bse and the EGR effective opening area Segr, which is caused by production variations, changes with time, or the like in the EGR valve 16, is stored as the EGR effective opening area learning value Kelrn, the EGR effective opening area learning value Kelrn is added to the desired EGR effective opening area Segr_tgt so that the learned EGR effective opening area is calculated; then, the desired EGR valve opening degree Est_tgt utilized in EGR control can be obtained by use of an EGR valve opening degree vs. effective opening area table.

In the step 707, the control amount of the EGR valve and the respective control amounts of the injector, the ignition coil, and the like are calculated; then, the processing ends. The control amount of the intake/exhaust VVT is calculated in the step 203 in FIG. 4.

Learning the EGR effective opening area in such a way as described above makes it possible to deal with changes with time in the EGR valve 16, and hence the EGR flow rate utilized in the control can accurately be estimated; calculation of the desired EGR ratio while performing correction in such a way that the total EGR ratio becomes constant makes it possible that while the EGR valve 16 and the intake/ exhaust VVT collaborate with each other, variations or changes with time in the EGR valve 16, a change in the environmental condition, and the like can be absorbed.

As described above, the internal combustion engine EGR flow rate estimation apparatus according to Embodiment 1 of the present invention and the internal combustion engine control apparatus provided with the EGR flow rate estimation apparatus make it possible that the cylinder intake air flow rate and the intake air flow rate are accurately estimated in both the steady driving mode and the transient driving mode of the internal combustion engine; thus, the internal combustion engine can appropriately be controlled. Moreover, even when due to deposits such as soot and the like, the flow rate characteristic changes or even when due to a change with time, the EGR valve or the intake/exhaust VVT does not work in order, the EGR valve opening degree vs. flow rate characteristic (effective opening area characteristic) can be learned from an estimated cylinder intake air flow rate and an estimated throttle flow rate; therefore, it is made possible that the desired EGR ratio is calculated while performing correction in such a way that the total EGR ration becomes constant and the EGR flow rate can accurately be estimated by use of the result of the learning; thus, the internal combustion engine can appropriately be controlled.

The internal combustion engine EGR flow rate estimation apparatus and the internal combustion engine control apparatuses, described heretofore, according to Embodiment 1 of the present invention are the ones obtained by putting the following inventions into practice.

(1) An internal combustion engine EGR flow rate estimation apparatus that estimates an EGR flow rate in an EGR flow path connecting an air-intake path at the downstream side of a throttle valve of an internal combustion engine and an exhaust path of the internal combustion engine, the internal combustion engine EGR flow rate estimation apparatus comprising:

an intake air flow rate calculation unit that calculates a flow rate of air taken into a cylinder of the internal combustion engine through the throttle valve of the internal combustion engine;

an EGR valve that opens or closes the EGR path so as to control an external EGR flow rate as an EGR flow rate in the EGR path;

a volume efficiency correction coefficient calculation unit that calculates a volume efficiency correction coefficient, as a volume efficiency corresponding value which is an index for indicating an amount of air that flows into a cylinder of the internal combustion engine, based on valve timing control of at least one of an intake valve and an exhaust valve of the internal combustion engine;

a cylinder flow rate calculation unit that calculates a cylinder flow rate of air that flows from the air-intake path at the downstream side of the throttle valve into the cylinder, based on a pressure in the air-intake path and the calculated volume efficiency correction coefficient;

an internal EGR ratio estimation unit that estimates, based on the valve timing control, an internal EGR ratio which is the ratio of an internal EGR flow rate, as a flow rate of exhaust gas, of the internal combustion engine, that remains in the cylinder, to the intake air flow rate calculated by the intake air flow rate calculation unit;

a desired intake air flow rate calculation unit that calculates a desired intake air flow rate of the internal combustion engine, based on desired torque of the internal combustion engine;

a desired external/internal EGR ratio estimation unit that estimates a desired external EGR ratio and a desired internal EGR ratio, based on the desired intake air flow rate calculated by the desired intake air flow rate calculation unit and a rotation speed of the internal combustion engine;

a desired EGR ratio estimation unit that calculates a desired EGR ratio, based on the desired external EGR ratio and the desired internal EGR ratio estimated by the desired external/internal EGR ratio estimation unit and the internal EGR ratio estimated by the internal EGR ratio estimation unit;

an EGR flow rate calculation unit that calculates an EGR flow rate, based on the cylinder flow rate calculated by the cylinder flow rate calculation unit and the intake air flow rate calculated by the intake air flow rate calculation unit;

an EGR effective opening area calculation unit that calculates an effective opening area of the EGR valve corresponding to an opening degree of the EGR valve, based on the EGR flow rate calculated by the EGR flow rate calculation unit;

an EGR effective opening area learning unit that learns a relationship between an EGR valve opening degree based on an output of an EGR valve opening degree sensor that detects an opening degree of the EGR valve and the EGR effective opening area calculated by the EGR effective opening area calculation unit; and an EGR valve opening degree calculation unit that calculates an opening degree of the EGR valve, wherein the EGR valve opening degree calculation unit calculates an EGR valve opening degree utilized in control of the internal combustion engine, based on the desired EGR ratio estimated by the desired EGR ratio estimation unit, the EGR effective opening area calculated by the EGR effective opening area calculation unit, and a learning value learned by the EGR effective opening area learning unit.

According to the present invention, the EGR valve opening degree is feedback-controlled in such a way that the internal and external desired EGR ratios are achieved, so that while collaborating with each other, the EGR valve and the intake/exhaust VVT can accurately be controlled.

(2) The internal combustion engine EGR flow rate estimation apparatus according to (1), wherein the desired external/internal EGR ratio estimation unit is configured in such a way that an intake air flow rate, a rotation speed of the internal combustion engine, an external EGR ratio, and an internal EGR ratio, which are the indexes for conforming parameters at a time when in the case where control of at least one of the external EGR flow rate and the internal EGR flow rate is utilized, the control conforms, are preliminarily set, and in such a way that from the preliminarily set external EGR ratio and internal EGR ratio, an external EGR ratio and an internal EGR ratio corresponding to a rotation speed of the internal combustion engine and an intake air flow rate at a time when the internal combustion engine is operated, wherein the desired EGR ratio estimation unit is configured in such a way that the desired EGR ratio is calculated by correcting the desired external EGR ratio, based on the difference between the desired internal EGR ratio and the real value of an internal EGR ratio, in such a way that the total EGR ratio, which is the total of an internal EGR ratio and an external EGR ratio, becomes constant, and wherein the desired EGR ratio estimation unit calculates the desired EGR ratio in such a way that the total EGR ratio is calculated based on the desired external EGR ratio and the desired internal EGR ratio estimated by the desired external/internal EGR ratio estimation unit and then the desired external EGR ratio is corrected by use of the internal EGR ratio so that the total EGR ratio becomes constant.

According to the present invention, the desired external EGR ratio is controlled in such a way that variations in the internal EGR ratio are absorbed, so that the total EGR ratio can be controlled so as to be constant.

(3) The internal combustion engine EGR flow rate estimation apparatus according to (1), an inner-intake-path pressure detection unit that is situated at the downstream side of the throttle valve and detects a pressure in the air-intake path connected with the EGR path;

an inner-exhaust-path temperature detection unit that detects a temperature in the exhaust path connected with the EGR path;

an inner-exhaust-path pressure detection unit that detects a pressure in the exhaust path connected with the EGR path;

an inner-exhaust-path sonic velocity calculation unit that calculates a sonic velocity in the exhaust path, based on a temperature in the exhaust path detected by the inner-exhaust-path temperature detection unit;

an inner-exhaust-path density calculation unit that calculates a density in the exhaust path, based on a pressure in the exhaust path detected by the inner-exhaust-path pressure detection unit and a temperature in the exhaust path detected by the inner-exhaust-path temperature detection unit;

an EGR base effective opening area calculation unit that calculates an EGR base effective opening area from a preliminarily set EGR valve opening degree vs. EGR base effective opening area map; and an effective opening area correction unit that corrects an EGR valve effective opening area utilized in control of the internal combustion engine, wherein the EGR effective opening area calculation unit is configured in such a way that an EGR effective opening area is calculated from an opening degree of the EGR valve, a pressure in the air-intake path, a pressure in the exhaust path, a sonic velocity in the exhaust path, an inner-exhaust-path density, and the EGR flow rate, wherein the EGR effective opening area learning unit is configured in such a way that the EGR effective opening area learning value is calculated based on an EGR effective opening area calculated by the EGR effective opening area calculation unit and an EGR base effective opening area calculated by the EGR base effective opening area calculation unit, wherein the effective opening area correction unit is configured in such a way that an EGR valve effective opening area utilized in controlling the internal combustion engine is corrected based on an EGR effective opening area learning value calculated by the EGR effective opening area learning unit, and wherein the EGR valve opening degree calculated unit learns a relationship between an EGR effective opening area calculated by the EGR effective opening area calculation unit and an opening degree of the EGR valve, and calculates an EGR valve opening degree utilized in control of the internal combustion engine, based on the learned relationship between the EGR effective opening area and the opening degree of the EGR valve.

According to the present invention, the relationship between the EGR valve opening degree and the EGR effective opening area is learned, so that even when the relationship changes with time, a correct opening degree vs. effective opening area characteristic can be maintained, and an accurate EGR valve opening degree learning value is utilized, so that the EGR valve opening degree can accurately be feedback-controlled.

(4) The internal combustion engine EGR flow rate estimation apparatus according to (1), wherein the desired external/internal EGR ratio estimation unit estimates the desired external EGR ratio, based on a rotation speed of the internal combustion engine and the intake air flow rate, said rotation speed and said intake air flow rate being operation conditions for controlling the external EGR flow rate.

According to the present invention, mapping utilizing operation conditions at a time when the external EGR control conforms makes it possible to readily estimate the desired external EGR ratio.

(5) The internal combustion engine EGR flow rate estimation apparatus according to (1), further including a desired phase angle calculation unit that calculates a desired phase angle for valve timing of at least one of the intake valve and the exhaust valve of the internal combustion engine, wherein the desired external/internal EGR ratio estimation unit estimates the desired internal EGR ratio, based on a rotation speed of the internal combustion engine and the intake air flow rate, said rotation speed and said intake air flow rate being valve timing operation conditions of at least one of the intake valve and the exhaust valve, and wherein the desired phase angle calculation unit calculates the desired phase angle, based on a rotation speed of the internal combustion engine and the intake air flow rate, said rotation speed and said intake air flow rate being valve timing operation conditions of at least one of the intake valve and the exhaust valve.

According to the present invention, mapping utilizing operation conditions at a time when the intake/exhaust VVT control conforms makes it possible to readily estimate the desired internal EGR ratio and the desired phase angle.

(6) The internal combustion engine EGR flow rate estimation apparatus according to (1), further including a desired phase angle calculation unit that calculates a desired phase angle for valve timing of at least one of the intake valve and the exhaust valve of the internal combustion engine, wherein the desired external/internal EGR ratio estimation unit estimates the desired internal EGR ratio, based on a rotation speed of the internal combustion engine and the desired intake air flow rate calculated by the desired intake air flow rate calculation unit, said rotation speed and said desired intake air flow rate being valve timing operation conditions of at least one of the intake valve and the exhaust valve, and wherein the desired phase angle calculation unit calculates the desired phase angle, based on a rotation speed of the internal combustion engine and the desired intake air flow rate calculated by the desired intake air flow rate calculation unit, said rotation speed and said desired intake air flow rate being valve timing operation conditions of at least one of the intake valve and the exhaust valve.

According to the present invention, the desired intake air flow rate is utilized in calculating the desired EGR valve opening degree and the desired phase angle, so that the responsiveness of EGR valve operation and intake/exhaust VVT operation can be improved.

(7) An internal combustion engine control apparatus including the internal combustion engine EGR flow rate estimation apparatus according to (1).

The present invention makes it possible to absorb variations, changes with time, and even environmental conditions, while making the EGR valve and the intake/exhaust VVT collaborate with each other; therefore, the EGR flow rate can accurately be estimated, and hence a high-accuracy internal combustion engine control apparatus can be obtained.

Various modifications and alterations of this invention will be apparent to those skilled in the art without departing from the scope and spirit of this invention, and it should be understood that this is not limited to the illustrative embodiments set forth herein.

What is claimed is:

1. An internal combustion engine EGR flow rate estimation apparatus that estimates an EGR flow rate in an EGR flow path connecting an air-intake path at the downstream side of a throttle valve of an internal combustion engine and an exhaust path of the internal combustion engine, the internal combustion engine EGR flow rate estimation apparatus comprising:
   the air-intake path for supplying air to the internal combustion engine;
   the internal combustion engine;
   the exhaust path of the internal combustion engine;
   the EGR flow path;
   an EGR valve configured to open or close the EGR flow path based on a calculated EGR valve opening degree so as to control an external EGR flow rate as an EGR flow rate in the EGR flow path; and
   a processor storing instructions to implement:
      an intake air flow rate calculator that calculates a flow rate of air taken into a cylinder of the internal combustion engine through the throttle valve of the internal combustion engine;
      a volume efficiency correction coefficient calculator that calculates a volume efficiency correction coefficient, as a volume efficiency corresponding value which is an index for indicating an amount of air that flows into a cylinder of the internal combustion engine, based on valve timing control of at least one of an intake valve and an exhaust valve of the internal combustion engine;
      a cylinder flow rate calculator that calculates a cylinder flow rate of air that flows from the air-intake path at the downstream side of the throttle valve into the cylinder, based on a pressure in the air-intake path and the calculated volume efficiency correction coefficient;
      an internal EGR ratio estimator that estimates, based on the valve timing control, an internal EGR ratio which is the ratio of an internal EGR flow rate, as a flow rate of exhaust gas, of the internal combustion engine, that remains in the cylinder, to the intake air flow rate calculated by the intake air flow rate calculator;
      a desired intake air flow rate calculator that calculates a desired intake air flow rate of the internal combustion engine, based on desired torque of the internal combustion engine;
      a desired external/internal EGR ratio calculator that calculates a desired external EGR ratio and a desired internal EGR ratio, based on the desired intake air flow rate calculated by the desired intake air flow rate calculator and a rotation speed of the internal combustion engine;
      a desired EGR ratio estimator that calculates a desired EGR ratio, based on the desired external EGR ratio and the desired internal EGR ratio estimated by the desired external/internal EGR ratio estimator and the internal EGR ratio estimated by the internal EGR ratio estimator;
      an EGR flow rate calculator that calculates an EGR flow rate, based on the cylinder flow rate calculated by the cylinder flow rate calculator and the intake air flow rate calculated by the intake air flow rate calculator;
      an EGR effective opening area calculator that calculates an effective opening area of the EGR valve corresponding to an EGR effective opening degree of the EGR valve, based on the EGR flow rate calculated by the EGR flow rate calculator;
      an EGR effective opening area learning calculator that determines a relationship between a detected opening degree of the EGR valve based on an output of an EGR valve opening degree sensor that detects the opening degree of the EGR valve and the EGR effective opening area calculated by the EGR effective opening area calculator; and
      an EGR valve opening degree calculator that calculates the calculated opening degree of the EGR valve and opens the EGR valve using the calculated EGR valve opening degree,
   wherein the EGR valve opening degree calculator calculates the EGR valve calculated opening degree utilized in control of the internal combustion engine, based on the desired EGR ratio estimated by the desired EGR ratio estimator, the EGR effective opening area calculated by the EGR effective opening area calculator, and a learning value learned by the EGR effective opening area learning calculator.

2. The internal combustion engine EGR flow rate estimation apparatus according to claim 1,
   wherein the desired external/internal EGR ratio estimator is configured in such a way that an intake air flow rate, a rotation speed of the internal combustion engine, an external EGR ratio, and an internal EGR ratio are preliminarily set in such a way that the preliminarily set external EGR ratio and internal EGR ratio are based on a rotation speed of the internal combustion engine and an intake air flow rate at a time when the internal combustion engine is operated,
   wherein the desired EGR ratio estimator is configured in such a way that the desired EGR ratio is calculated by correcting the desired external EGR ratio, based on the difference between the desired internal EGR ratio and the real value of an internal EGR ratio, in such a way that the total EGR ratio, which is the total of an internal EGR ratio and an external EGR ratio, becomes constant, and
   wherein the desired EGR ratio estimator calculates the desired EGR ratio in such a way that the total EGR ratio is calculated based on the desired external EGR ratio and the desired internal EGR ratio estimated by the desired external/internal EGR ratio estimator and then the desired external EGR ratio is corrected by use of the internal EGR ratio so that the total EGR ratio becomes constant.

3. The internal combustion engine EGR flow rate estimation apparatus according to claim 1, comprising:
   an inner-intake-path pressure sensor that is situated at the downstream side of the throttle valve and detects a pressure in the air-intake path connected with the EGR path;
   an inner-exhaust-path temperature sensor that detects an temperature in the exhaust path connected with the EGR path;
   an inner-exhaust-path pressure sensor that detects a pressure in the exhaust path connected with the EGR path;

an inner-exhaust-path sonic velocity calculator that calculates a sonic velocity in the exhaust path, based on a temperature in the exhaust path detected by the inner-exhaust-path temperature sensor;

an inner-exhaust-path density calculator that calculates a density in the exhaust path, based on a pressure in the exhaust path detected by the inner-exhaust-path pressure sensor and a temperature in the exhaust path detected by the inner-exhaust-path temperature sensor;

an EGR base effective opening area calculator that calculates an EGR base effective opening area from a preliminarily set EGR valve opening degree vs. EGR base effective opening area map; and an effective opening area correction unit that corrects an EGR valve effective opening area utilized in controlling the internal combustion engine, wherein the EGR effective opening area calculator is configured in such a way that an EGR effective opening area is calculated from the detected opening degree of the EGR valve, a pressure in the air-intake path, a pressure in the exhaust path, a sonic velocity in the exhaust path, an inner-exhaust-path density, and the EGR flow rate, wherein the EGR effective opening area learning calculator is configured in such a way that the EGR effective opening area learning value is calculated based on an EGR effective opening area calculated by the EGR effective opening area calculator and an EGR base effective opening area calculated by the EGR base effective opening area calculator, wherein the effective opening area correction unit is configured in such a way that an EGR valve effective opening area utilized in controlling the internal combustion engine is corrected based on an EGR effective opening area learning value calculated by the EGR effective opening area learning calculator, and wherein the EGR valve opening degree calculator learns a relationship between an EGR effective opening area calculated by the EGR effective opening area calculator and the detected opening degree of the EGR valve, and calculates the EGR valve calculated opening degree utilized in controlling the internal combustion engine, based on the learned relationship between the EGR effective opening area and the detected opening degree of the EGR valve.

4. The internal combustion engine EGR flow rate estimation apparatus according to claim 1, wherein the desired external/internal EGR ratio estimator estimates the desired external EGR ratio, based on a rotation speed of the internal combustion engine and the intake air flow rate, said rotation speed and said intake air flow rate being operation conditions for controlling the external EGR flow rate.

5. The internal combustion engine EGR flow rate estimation apparatus according to claim 1, further including a desired phase angle calculator that calculates a desired phase angle for valve timing of at least one of the intake valve and the exhaust valve of the internal combustion engine, wherein the desired external/internal EGR ratio estimator estimates the desired internal EGR ratio, based on a rotation speed of the internal combustion engine and the intake air flow rate, said rotation speed and said intake air flow rate being valve timing operation conditions of at least one of the intake valve and the exhaust valve, and wherein the desired phase angle calculator calculates the desired phase angle, based on a rotation speed of the internal combustion engine and the intake air flow rate, said rotation speed and said intake air flow rate being valve timing operation conditions of at least one of the intake valve and the exhaust valve.

6. The internal combustion engine EGR flow rate estimation apparatus according to claim 1, further including a desired phase angle calculator that calculates a desired phase angle for valve timing of at least one of the intake valve and the exhaust valve of the internal combustion engine, wherein the desired external/internal EGR ratio estimator estimates the desired internal EGR ratio, based on a rotation speed of the internal combustion engine and the desired intake air flow rate calculated by the desired intake air flow rate calculator, said rotation speed and said desired intake air flow rate being valve timing operation conditions of at least one of the intake valve and the exhaust valve, and wherein the desired phase angle calculator calculates the desired phase angle, based on a rotation speed of the internal combustion engine and the desired intake air flow rate calculated by the desired intake air flow rate calculator, said rotation speed and said desired intake air flow rate being valve timing operation conditions of at least one of the intake valve and the exhaust valve.

7. An internal combustion engine control apparatus including the internal combustion engine EGR flow rate estimation apparatus according to claim 1.

* * * * *